United States Patent Office 3,105,319
Patented Oct. 1, 1963

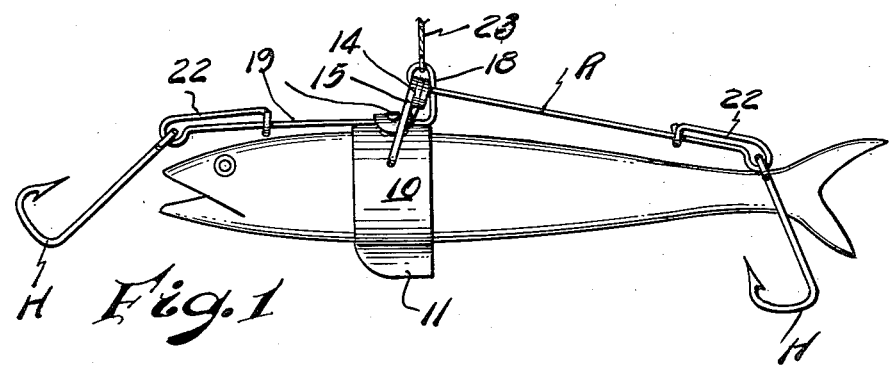
Fig. 1
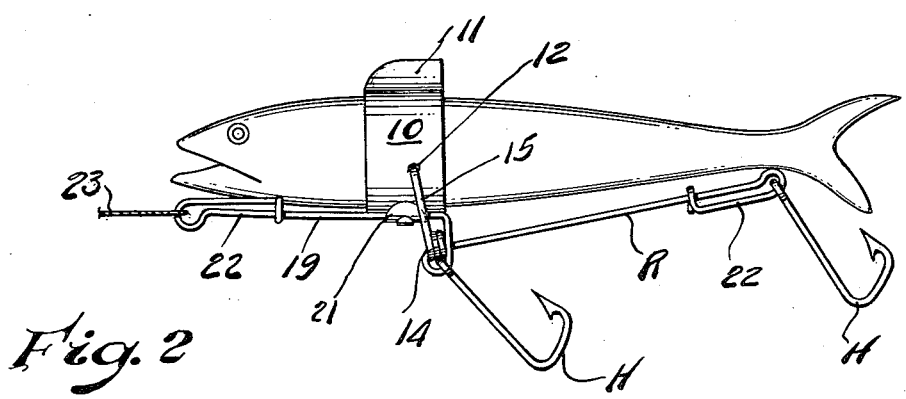
Fig. 2
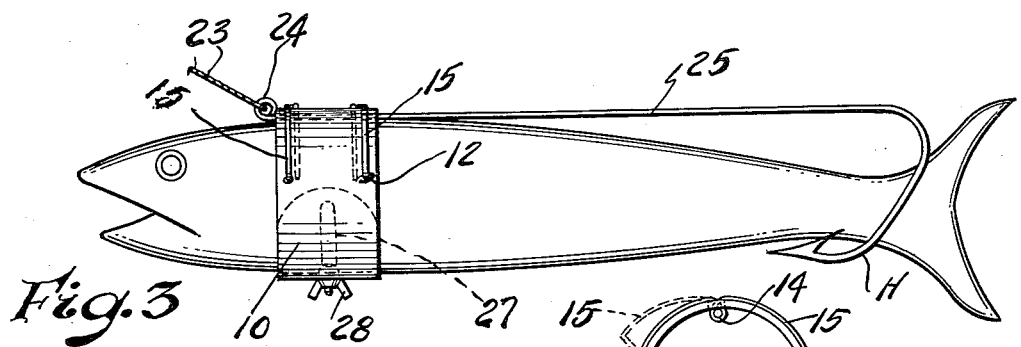
Fig. 3
Fig. 6
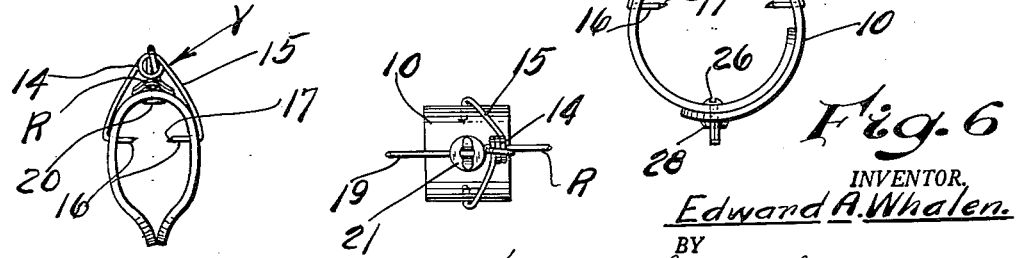
Fig. 4   Fig. 5
INVENTOR.
Edward A. Whalen.
BY
Learman Learman McCulloch
ATTORNEYS

3,105,319
LIVE BAIT HARNESS
Edward A. Whalen, 914 Garfield Ave., Bay City, Mich.
Filed Mar. 26, 1962, Ser. No. 182,496
5 Claims. (Cl. 43—44.4)

This invention relates to a bait harness for use in fishing and by means of which bait may be kept alive and active for long periods of time.

One of the prime objects of the invention is to design a simple, practical and economical bait harness in which a live bait may be placed and held without injuring or otherwise curtailing the normal activity of the bait while swimming.

Another object of the invention is to provide a harness which is adjustable to suit bait or fish of different size, which is well balanced for casting, spinning or trolling, and which rides upright in the water with no spin or rolling action regardless of how fast or slow the bait is drawn.

A further object is to provide a bait harness including a plastic band which reflects light to attract game fish, and this in addition to the fact that the bait is live producing a most attractive lure.

Still a further object is to design a bait harness which can be readily manufactured and assembled, which firmly retains the bait in the harness, which does not engage the fins of the bait, and which is simple and easy to apply and remove.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and minor details of construction, without departing from the spirit, or sacrificing any of the advantages of the invention.

In the drawing:

FIG. 1 is a side elevational view of my bait harness showing a bait in position therein.

FIG. 2 is a view similar to FIG. 1, showing the harness inverted, and the hooks depending below the bait.

FIG. 3 is a slightly modified harness of large size, adaptable for deep sea fishing.

FIG. 4 is a front, elevation view of the harness shown in FIG. 1 with the hooks, etc. omitted.

FIG. 5 is a fragmentary top plan view of the harness, also with the hooks omitted, and FIG. 6 is an enlarged, end, elevational view, of the harness shown in FIG. 3, the broken lines showing one leg of the yoke sprung out of engagement with the bait and bearing on the band.

Referring now to the drawing in which I have shown the preferred embodiment of my invention, and more particularly to FIGURES 1 and 2 thereof, the numeral 10 indicating a body embracing band, preferably but not necessarily formed of plastic, and shaped to engage a bait B which can be a minnow or a fish of a size used for deep sea fishing. The band 10 is formed of a resilient plastic material, the ends being curved as at 11, and the plastic is sufficiently resilient so that the band tightly hugs the body of the bait. Opposed openings 12 are provided in the bait B directly adjacent the meaty portion of the back of the fish.

A yoke member Y is mounted on the band 10 and comprises a coiled wire section 14 formed with outwardly diverging legs 15 which straddles the upper section of the band, the end section 16 of each leg being bent inwardly as shown and extends through the openings 12 in the band, the ends of the sections being sharpened as at 17 so that they readily pierce the meaty portion of the back of the bait to hold the harness in position.

The hook attachment member R is also formed of wire, being looped thru the coils 14 at a point intermediate its length, thence extending downwardly against the face of the holder as at 18, and thence projecting forwardly as at 19, with a pronged rivet 20 mounted in a suitable opening, not shown, in the holder and extending thru a washer 21 which overlies the wire 19, the pronged end of the rivet being bent down on the washer to firmly clamp the wire 19 in position. A clasp 22 is formed on the front end of the wire 19, and a conventional fish hook H is secured thereon as usual.

The opposite end section of the attachment extends rearwardly and another clasp 22 is formed on the end of said section for attachment of another hook H as shown.

A leader 23 is attached to the loops 14 as usual, and is thence connected to a fishing line (not shown), in the usual manner.

To place the harness on a bait, it is merely necessary to spring the yoke legs 15 outwardly free of the openings 12, with the sharpened prongs engaging the outer surface of the band 10, all as indicated in broken lines in FIG. 6 of the drawing, and then by springing or flexing the ends 11 of the band from each other, it will be obvious the bait can be readily inserted in the harness, after which the prong sections 16 are reinserted through the openings 12 to pierce the meaty part of the bait, and firmly anchor it in the harness.

When casting or trolling, the harness is mounted as indicated in FIG. 2 of the drawing, the free ends 11 projecting above the back of the bait and the coiled wire, yoke and hooks being disposed below the bait, with the leader 23 connected to the front clasp end of the wire and the front hook connected to the coiled section of the wire.

For deep sea fishing and the like, another modification is shown in FIGS. 3 and 6 of the drawing. In this construction, there are two yoke members, the coil sections 14 being turned downwardly and project through suitable openings (not shown), provided in the band, with the diverging legs 15 hugging the body of the band, and the prong sections extending through the openings 12 in exactly the same manner as before described. However, in the present instance, and because of the size of the bait, the shank end of a large fishhook H leads through the loops 14 and the leader 23 is attached to the looped end 24 of the shank 25 of the hook, said shank extending rearwardly and terminating in a hook H of conventional design.

The band 10 shown in FIGS. 3 and 6 is relatively wide with the ends overlapping each other, one end having a small bolt 26 mounted therein, said bolt projecting through a slotted passage 27 provided in the opposite end and a nut 28 is provided on the screw for clamping the band on the bait, otherwise the general construction is exactly the same.

The foregoing description and illustrations set forth a preferred form of the invention, however, it is contemplated that the invention shall include any varients or modifications thereof that lie within the terminology of the following claims.

What I claim:

1. In a harness of the character described adapted to receive a live bait comprising; a relatively wide, resilient band embracing the body of the live bait; a wire yoke mounted on said band and including a plurality of stressed coils, and a pair of downwardly extending, diverging legs leading from said coils and terminating in pronged bent sections overlying said band; passages in said band at a point adjacent the meaty portion of the back of the bait; said pronged sections extending through said passages for anchorage in the meaty portion of the back of the bait to hold the band in position; a horizontally disposed wire member mounted on said band and engageable with said stressed coils; and a plurality of fishhooks mounted on said horizontally disposed wire member.

2. In a bait harness of the character described adapted to receive a live bait comprising; a split, resilient band embracing said bait; a wire yoke formed with a looped, coiled section disposed above said band and terminating in a pair of downwardly extending legs; the lower end sections of which are turned at substantially right angles to the main body; passages in the band at a point adjacent the meaty portion of the back of the bait, and through which the end sections project when the harness is in position; and a horizontally disposed wire anchored on said band and leading through said looped coil section, and a plurality of fishhooks mounted on said horizontally disposed wire.

3. The combination defined in claim 2 in which the horizontally disposed wire anchoring means comprises a washer on the band; a split rivet mounted in said band and anchoring said washer in position, with the horizontally disposed wire disposed between the washer and the band for clamping said frame to said band.

4. The combination defined in claim 2 in which the lower turned leg sections of the yoke engage the resilient band when no bait is in the harness; said sections extending through the passages in the band for anchorage in the meaty back portion of the live bait when the bait is in position in the harness.

5. In a harness of the character described adapted to receive a live bait; a resilient band embracing the body of the bait; a horizontally disposed wire member secured, at a point intermediate its length, to said band and provided with a raised loop directly over said band, and a wire yoke member formed with a coiled section engageable in said raised loop; said coiled section terminating in opposed, diverging, depending legs formed with inturned prong sections projecting through said band, and hooks releasably mounted on the opposite ends of the main wire.

References Cited in the file of this patent
UNITED STATES PATENTS

| | | |
|---|---|---|
| 2,588,526 | Hoage | Mar. 11, 1952 |
| 2,860,443 | Robinson | Nov. 18, 1958 |
| 2,927,393 | Flamisch et al. | Mar. 8, 1960 |
| 2,932,116 | Woodzick | Apr. 12, 1960 |